United States Patent [19]

Kodis

[11] Patent Number: 5,137,194

[45] Date of Patent: Aug. 11, 1992

[54] LADDER SUPPORT RACK

[75] Inventor: Harry A. Kodis, Renton, Wash.

[73] Assignee: U S West Business Resources, Inc., Thornton, Colo.

[21] Appl. No.: 629,508

[22] Filed: Dec. 8, 1990

[51] Int. Cl.$^5$ .............................................. B60R 9/00
[52] U.S. Cl. .................................. 224/310; 224/315; 224/323
[58] Field of Search ............... 224/310, 315, 323, 324, 224/309, 329; 296/3; 182/127

[56] References Cited

U.S. PATENT DOCUMENTS

| | | | |
|---|---|---|---|
| 2,615,667 | 10/1952 | Smith et al. | 224/323 X |
| 3,481,518 | 12/1969 | Anetsberger | 224/310 |
| 3,888,398 | 6/1975 | Payne | 224/315 X |
| 4,170,331 | 10/1979 | Faulstich | 224/324 |
| 4,390,117 | 6/1983 | Fagan | 224/310 |

Primary Examiner—Henry J. Recla
Assistant Examiner—David J. Walczak
Attorney, Agent, or Firm—Timothy R. Schulte

[57] ABSTRACT

A ladder support rack capable of holding a ladder in place on a vehicle and quickly releasing it for use. A bell crank is pivoted to cause latching arms connected to the bell crank to move into and out of latching position. The latching arms are positioned to move between the ladder rungs and to engage predetermined rungs when holding the ladder in place. The ladder can be set into place and removed either from the end or the side of the rack.

4 Claims, 3 Drawing Sheets

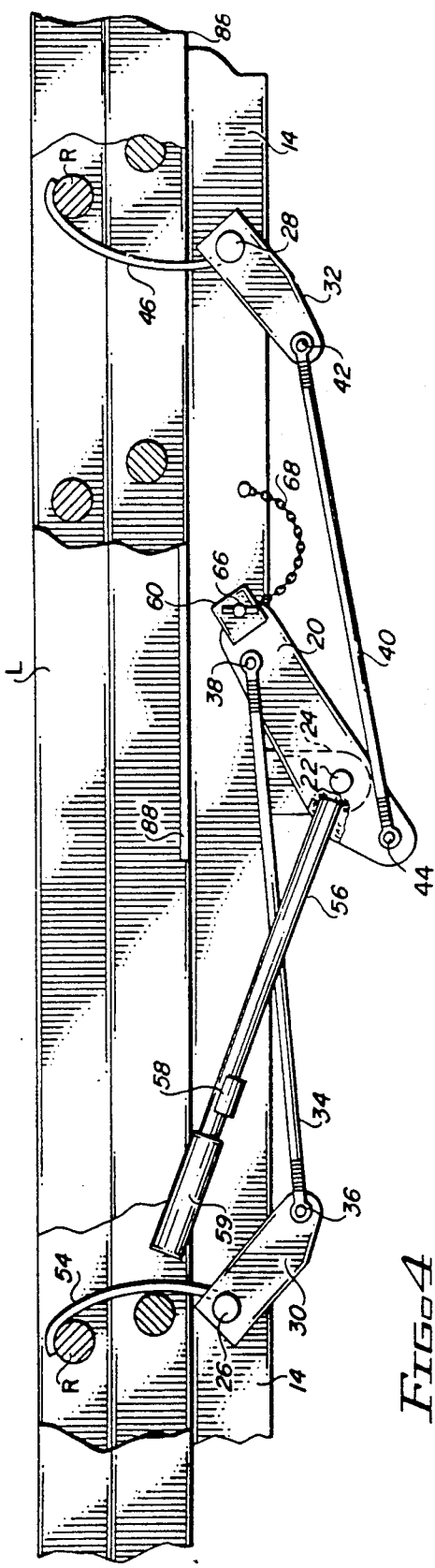
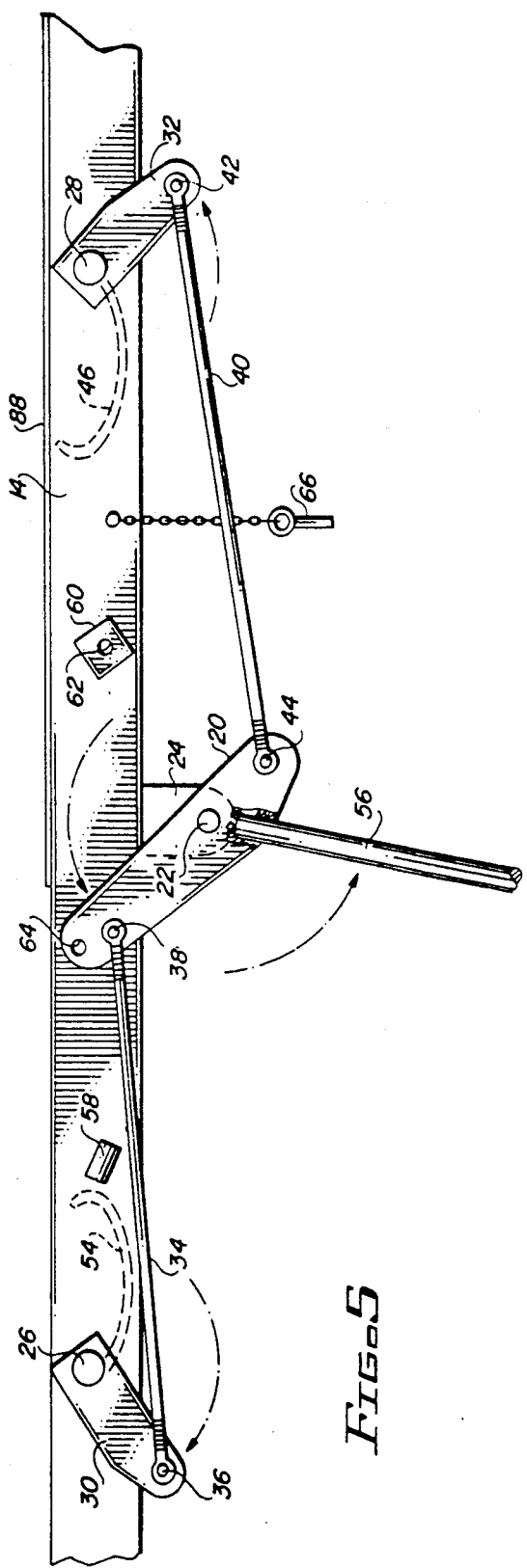

LADDER SUPPORT RACK

FIELD OF THE INVENTION

This is invention relates to a ladder support rack. More particularly, it relates to a support rack capable of supporting and restraining a ladder on a vehicle.

BACKGROUND OF THE INVENTION

The services provided by many industries require workers to bring ladders to a job site on their work vehicles. For example, utility workers commonly drive trucks and vans which are specially equipped to carry quite large extension ladders. This in turn requires the vehicles to be equipped with means for safely and securely carrying the ladders.

Most vehicular ladder support racks are simply a frame attached to the body of the vehicle for supporting a horizontally disposed ladder. The frame generally has side restraints in the form of side plates or shoulders, with the ladder being tied down by one or more straps or clamps to prevent shifting during transportation. Such an arrangement has a number of drawbacks. It often fails to provide adequate restraint during transportation and does not prevent theft of the ladder when the vehicle is stored. Further, because many ladders now in use are comprised of fiber glass reinforced resin to take advantage of the strength and light weight of this material, the resin tends to wear from the rubbing and chafing to which it is subjected when the ladder is not securely restrained from lateral movement and bouncing during transportation. Also, the height and length of the side restraints of present support racks requires the ladder to be loaded and unloaded from the rear of the truck, which is not always possible when parking restrictions leave no room in the rear. This then requires very difficult maneuvering of the ladder by the worker to remove and replace it over the side shoulders of the support rack, a task which can be extremely difficult for a worker of small stature.

It would be beneficial to have a ladder support which facilitates loading and unloading and yet provides secure restraint during transportation as well as theft prevention during periods of storage. It would further be beneficial to be able to readily load and unload a ladder from either the rear or side of a vehicle. In addition, the locking and unlocking of a ladder from the support ideally should be quick and easy to perform.

SUMMARY OF THE INVENTION

In accordance with the invention, two rocker arms are pivotally mounted at spaced points on an elongated ladder-supporting frame carried by a vehicle. Latching arms connected to the rocker arms are mounted for pivotal movement by the rocker arms into and out of ladder latching position, and means are connected to the rocker arms for moving them in unison about their pivotal mounts to cause the latching arms to move into and out of latching position.

The means for moving the rocker arms about their pivotal mounts comprises a lever pivotally mounted on the frame and connected to the rocker arms by rigid connectors pivotally attached to both the lever and the rocker arms. In a preferred embodiment, the lever is mounted between the rocker arms, functioning as a bell crank. Preferably, the rocker arms are connected to transversely extending supports which are rotatably mounted in the frame, with the latching arms being mounted on the transverse supports for movement therewith.

Means are also provided to facilitate loading and unloading a ladder. Rollers may be provided for temporarily supporting the ladder as it is moved into position from the end of the frame, and side restraints may be provided at strategic locations to enable the ladder to be loaded or unloaded from the side.

The various features of the invention which enable a ladder to be securely locked in place and to be conveniently loaded and unloaded from a support frame on a vehicle are brought out in more detail in the description which follows, wherein the above and other aspects of the invention, as well as other benefits thereof, will readily be apparent.

BRIEF DESCRIPTION OF THE DRAWINGS

FIG. 4 is an enlarged partial side elevation of the support rack, with portions of a ladder supported on the rack being broken away to show the latching arms in latching position;

FIG. 5 is a view similar to that of FIG. 4, but showing the latching arms in unlatched position and with the ladder no longer in place;

DETAILED DESCRIPTION OF THE PREFERRED EMBODIMENT

Figure 1:
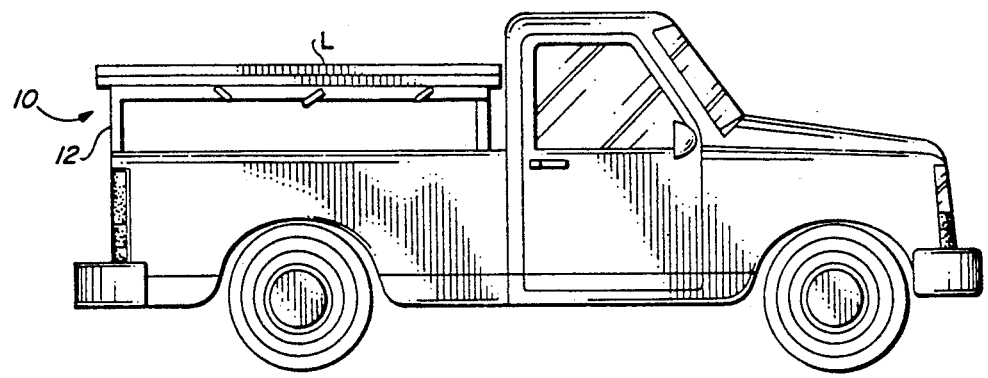
FIG. 1 is a side elevation of a truck carrying the ladder support rack of the present invention.

Referring to FIG. 1, the rack 10 of the present invention is illustrated in a typical working environment, supporting a ladder L on a service truck. The rack is shown as being supported by legs 12 which are attached by welding or other suitable means to support structure on the truck bed.

Figure 2:
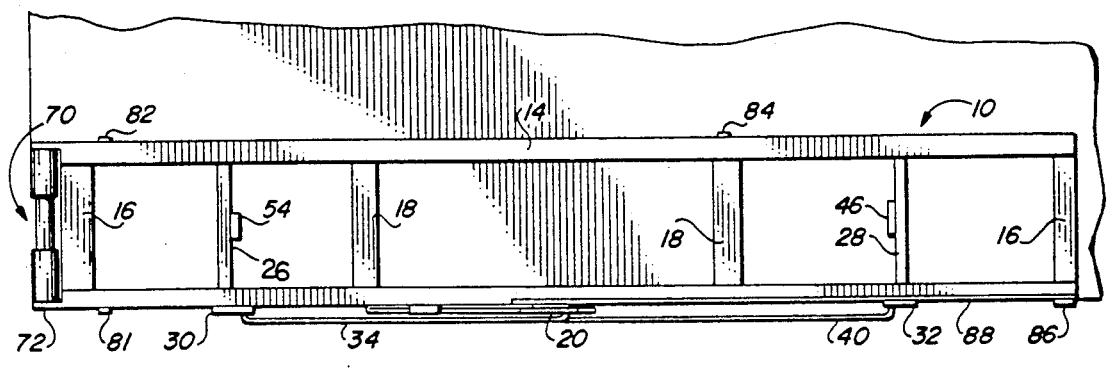
FIG. 2 is a plan view of the support rack with the ladder omitted to better show the structure.
Figure 3:
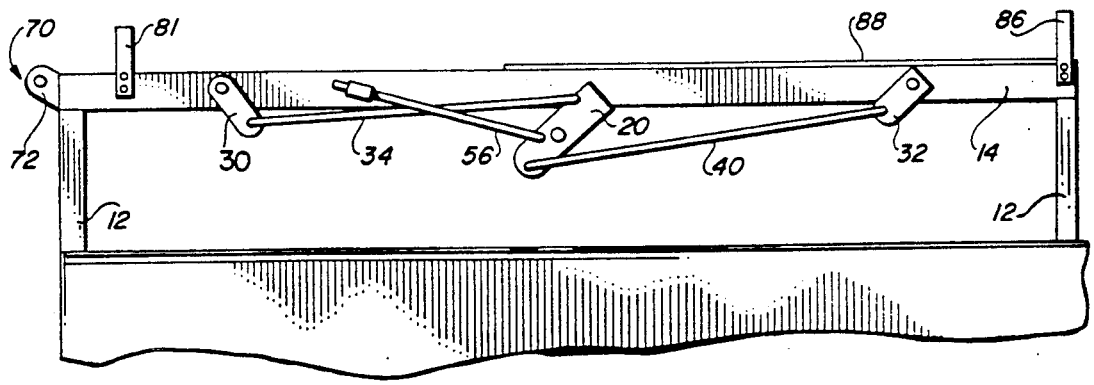
FIG. 3 is an enlarged side elevation of the ladder support rack of FIG. 2, showing the latching mechanism in locked position.

As shown in FIGS. 2 and 3, the rack 10 consists of a frame comprising elongated members 14 connected by end cross support members 16 and intermediate members 18. The elongated frame members and the end cross support members may be of any suitable type, such as angle irons, while the intermediate support members may be flat bars. For example, elongated angles ⅛ inch thick and 2 inches by 2 inches in cross-section have been successfully employed to form a rack suitable for supporting an extension ladder 24 to 28 feet long. The reinforcing flat bars, which may be located as needed, were ⅛ inch thick and 2.5 inches in width. Similarly dimensioned angles were found to be satisfactory for use as the support legs 12.

Still referring to FIGS. 2 and 3, and also to FIG. 4, the ladder latching and restraining mechanism comprises a lever 20 mounted for pivotal movement about pin 22. The pin, which may conveniently be a cap screw, is bolted in place in hanger mount 24. Secured to the ends of shafts 26 and 28, which are rotatably mounted in opposite frame members 14 on either side of the lever mount 24, are rocker arms 30 and 32. A rod 34 is pivotally connected to rocker arm 30 and lever 20 by clevises 36 and 38. Similarly, rod 40 is pivotally connected to rocker arm 32 and lever 20 by clevises 42 and 44. As illustrated in FIG. 4, the rods 34 and 40 are threaded at their ends for attachment to the internally threaded clevises, thereby allowing the rods to be adjusted to the proper tension. The hanger mount 24, which may be attached to the inner face of the elongated frame member 14 by welding, is dimensioned so that the portion receiving the pin 22 extends out to the plane of the outer face of the frame member in order for the lever 20 and the rocker arms 30 and 32 to lie in the same general vertical plane. This arrangement allows the lever and rocker arms to freely rotate or pivot about their pivot points. The rods 34 and 40 are attached to the lever 20 at points located on either side of the pin 22 so that the lever functions as a bell crank, with pivotal movement of the lever causing pivotal movement of the rocker arms in opposite directions.

Figure 6:
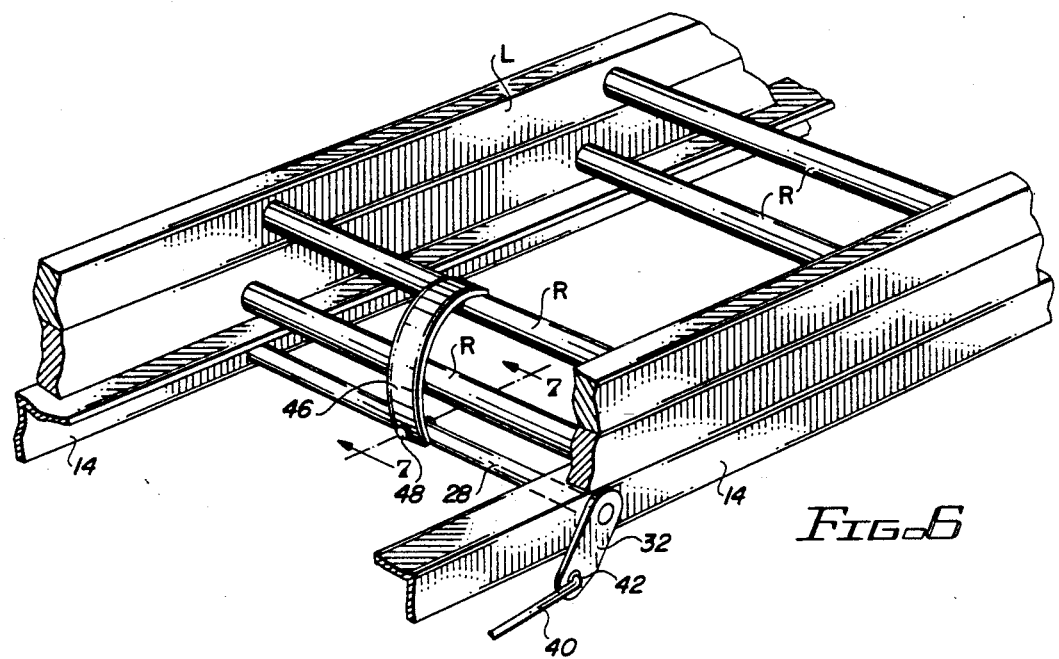
FIG. 6 is an enlarged partial pictorial view of the support rack, showing the latching arms engaged with the rungs of a ladder.
Figure 7:
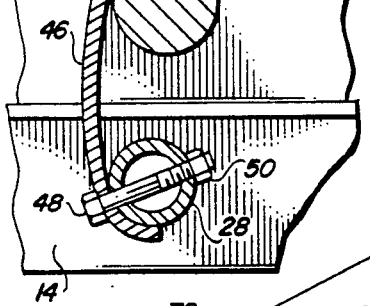
FIG. 7 is a longitudinal sectional view of a latching arm and its mounting connection taken on line 7—7 of FIG. 6.
Figure 9:
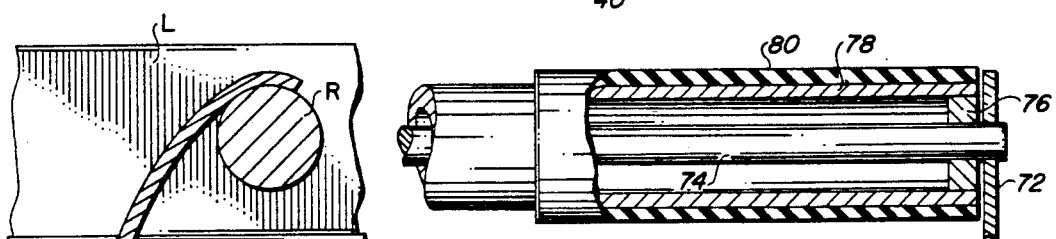
FIG. 9 is a partial longitudinal sectional view of the roller mount taken on line 9—9 of FIG. 8.

Referring now to FIGS. 4, 6 and 7, a latching arm 46 is attached to the shaft 28 for movement therewith. As illustrated best in FIG. 7, this may be accomplished by connecting the base portion of the latching arm to the shaft by means of a cap screw 48 and lock nut 50. Washers, not shown, will be utilized if desired. Although the shaft 28 has been shown as a pipe, it may take the form of any convenient structure. The latching arm 46 is attached to the shaft 28 substantially at the midpoint of the shaft, and is of sufficient length so as to engage the top rung R of the ladder L when in the latched position. It should not be so long, however, as to become snagged by the next rung in the ladder as the latching arm is moved from unlatched to latched position. The end portion of the latching arm is preferably hooked or curved as at 52 to form a finger for securely contacting the rung. The shaft 26 is also connected to a latching arm 54, the structure of which is the same as, although reversed from, the latching arm 46.

As shown in FIGS. 4 and 5, a handle 56 is attached to the lever as by welding, and a bracket 58 is welded to the frame member 14 for supporting the handle when the mechanism is in latched position. The bracket 58 preferably has a lip or flange at its extremity which prevents the handle 56 from sliding off the bracket. The end portion of the handle may include a suitable grip, such as a rubber sleeve 59, and may be bent away from the frame 14 to provide sufficient room for a worker to grasp it. Another bracket 60 is welded to the frame member 14 on the other side of the hanger mount 24. The bracket 60 contains an opening 62 which is aligned with an opening 64 in the lever 20 when the mechanism is in latched position. The aligned openings are adapted to receive a pin 66, which may be attached to the frame by a chain 68 or other means, so that the lever will be prevented from accidently moving out of latched position.

Referring to FIGS. 2, 3, 8 and 9, the back end of the frame is provided with a roller 70 to facilitate loading and unloading the ladder. Brackets 72, which are welded to the back ends of the frame members 14, contain an opening for receiving a shaft, such as a pipe 74, which is attached to the brackets as by welding. The shaft 74 fits within a bearing 76, which is mounted in the end of a larger pipe 78. Rubber sleeves 80 fit over the pipe 78 to provide a resilient surface over which the ladder can be moved. The brackets 72 are designed so that the outer surfaces of the rubber sleeves 80 are elevated above the frame 14 to facilitate sliding or rolling a ladder over the rollers as it is moved into place on the support frame.

In operation, when loading a ladder from the back of a vehicle, the front end of the ladder is moved onto the roller 70 and is slid into place on the support frame. The rollers facilitate the operation to the extent that only one person, even if of small stature, can readily lift the front end of the ladder up onto the roller and push the ladder forward into place. The latching mechanism at this time would be in the position shown in FIG. 5, wherein the rocker arms 30 and 32 have moved the latching arms 46 and 54 down below the frame so that they are not in position to impede forward movement of the ladder.

In order to lock the ladder in place, it is merely necessary to grasp the handle 56 as it appears in FIG. 5, move it up over the front lip or flange of the bracket 58 and allow it to be supported by the bracket. This action moves the lever 20 in a clockwise direction, causing the rod 34 to rotate the rocker arm 30 and its shaft 26 in a counterclockwise direction and the rod 40 to rotate the rocker arm 32 and its shaft 28 in a clockwise direction. The latching arm 56 is thus rotated in a counterclockwise direction from the unlatched position of FIG. 5, and the latching arm 46 is rotated in a clockwise direction from its unlatched position. The latching arms will be located with respect to the predetermined location of the ladder rungs so that they rotate up between adjacent rungs without obstruction. The latching arms are thus moved to the position shown in FIG. 4, wherein their engagement with two of the rungs holds the ladder in place and restrains it from moving. By inserting the pin 66 in the aligned openings 62 of the bracket 60 and 64 of the lever 20, the lever is prevented from accidentally rotating about its pivot pin 22.

As indicated above, the lip of the bracket 58 prevents the handle from slipping off the bracket, thus providing dual locking protection. When unlocking the latching arms, it is merely necessary, after removing the pin 66, to lift the handle 56 the slight amount required to move the handle up over the lip of the bracket 58 to free the handle for downward movement. The mechanism is easily capable of absorbing this slight tightening movement, as there is enough play in the system to allow it.

Figure 8:
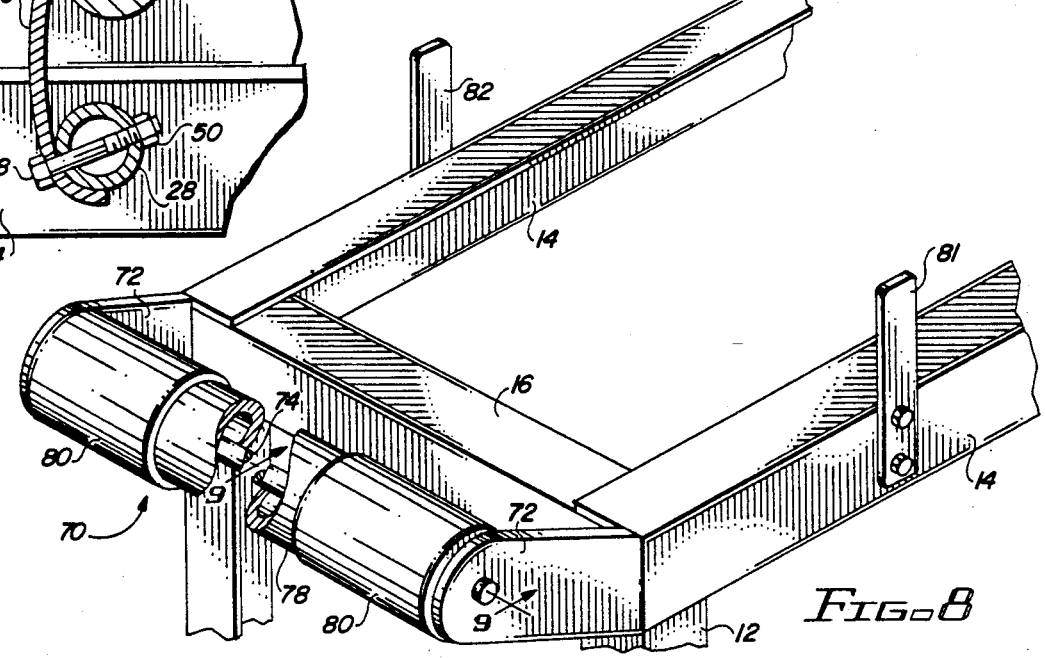
FIG. 8 is an enlarged partial pictorial view of the end of the support rack, showing the roller in more detail.

In addition to the locking restraint described, it is usually desirable to provide additional structural restraints to further prevent lateral movement of the ladder. As shown in FIGS. 2 and 3, this preferably should take the form of narrow upright bars 81 and 82 located on opposite sides of the frame adjacent the back end thereof, an upright bar 84 located on the far side of the frame intermediate the ends, and a fourth upright bar 86 located on the near side of the frame adjacent the front end thereof. As best shown in FIG. 8, the uprights are bolted to the frame 14 and extend upwardly a distance sufficient to cover a substantial portion of the width of the ladder.

By locating the uprights in this manner, the ladder is not only restrained against lateral movement but can be loaded and unloaded from the side of the vehicle if necessary. Thus, to load the ladder from the side, the front end of the ladder would be placed on the front end portion of the ladder support frame so that the outer edge of the ladder engages the inner face of the upright 86. The back end of the ladder can then be "walked" into place on the frame, using the upright 86 as a pivot point. The space between the uprights 84 and 86 permits the ladder to be maneuvered into position in this fashion.

To prevent a fiber glass reinforced resin ladder from chafing as it slides over the edge of the frame during the side loading pivoting movement described above, the frame edge can be softened or blunted by forming it as a rounded surface. A practical way of doing this is to weld a rod 88 to the edge portion of the frame over which the ladder may slide.

It should now be appreciated that the invention allows ready loading and unloading of a ladder onto a vehicular support from either the side or back of a vehicle so that the ladder rests flat on the support, and provides for automatically locking the ladder in place by simply moving a handle. The locking or latching arms stay in their latched position due to the means provided for holding the crank lever as well as the handle in place. The mechanism is simple yet effective, and further is highly reliable since the equipment is sturdy and requires little maintenance.

Although the invention has been described in some detail in connection with the preferred embodiment, it will be appreciated that it need not necessarily be limited to all such details, and that changes to certain features of the preferred embodiment which do not alter the overall basic function and concept of the invention may be made without departing from the spirit and scope of the invention defined in the claims.

What is claimed is:

1. A ladder support rack adapted to be mounted on a vehicle, comprising:
    an elongated frame having a support surface adapted to support a ladder oriented with the rungs thereof extending generally horizontally;
    a pair of spaced rocker arms mounted to pivot about substantially horizontal axes on one side of the frame below the support surface of the frame;
    a pair of rods, each having one end thereof pivotally connected to the rocker arms and an opposite end thereof pivotally connected to a bell crank; said bell crank mounted to pivot about a substantially horizontal axis on said one side of the frame between the rocker arms;
    latching arms connected to the rocker arms and mounted for movement about said substantially horizontal axes of said rocker arms into and out of engagement with said rungs; and
    means for moving the bell crank in opposite rotary directions about its pivotal connection to the frame, whereby the rocker arms are caused to move the latching arms into and out of latching position.

2. The ladder support rack of claim 1, including a plurality of side support members extending upwardly from the frame closely adjacent the area intended to be occupied by a ladder, wherein the side support members are widely spaced on one side of the rack so as to allow the ladder to be maneuvered onto and off of the support rack either from an end of the rack or from said one side thereof.

3. A ladder support rack adapted to be mounted on a vehicle, comprising:
    an elongated frame having a support surface adapted to support a ladder oriented with the rungs thereof extending generally horizontally;
    a pair of spaced rocker arms pivotally mounted on one side of the frame below the support surface of the frame;
    a pair of rods, each having one end thereof pivotally connected to the rocker arms and an opposite end thereof pivotally connected to a bell crank; said bell crank mounted to pivot about a substantially horizontal axis on said one side of the frame between the rocker arms;
    a pair of transversely extending support shafts rotatably mounted in the frame about substantially horizontal axes, each rocker arm being connected to an associated support shaft adjacent an end thereof to rotate therewith, and
    a pair of latching arms, each connected to a support shaft, and mounted at a location spaced from the rocker arm for movement about said substantially horizontal axes of said shafts into and out of engagement with said rungs; and
    means for moving the bell crank in opposite rotary directions about its pivotal connection to the frame, whereby the rocker arms are caused to rotate, thereby moving the latching arms into and out of latching position.

4. The ladder support rack of claim 3, including a plurality of side support members extending upwardly from the frame closely adjacent the area intended to be occupied by a ladder, wherein the side support members are widely spaced on one side of the rack so as to allow the ladder to be maneuvered onto and off of the support rack either from an end of the rack or from said one side thereof.

* * * * *